(12) United States Patent
Wirola et al.

(10) Patent No.: US 11,320,512 B2
(45) Date of Patent: May 3, 2022

(54) DETERMINING A POSITION ESTIMATE OF AN ASSET

(71) Applicant: HERE GLOBAL B.V., Eindhoven (NL)

(72) Inventors: Lauri Aarne Johannes Wirola, Tampere (FI); Mikko Blomqvist, Tampere (FI)

(73) Assignee: HERE Global B.V., Eindhoven (NL)

( * ) Notice: Subject to any disclaimer, the term of this patent is extended or adjusted under 35 U.S.C. 154(b) by 317 days.

(21) Appl. No.: 16/571,984

(22) Filed: Sep. 16, 2019

(65) Prior Publication Data

US 2020/0103488 A1    Apr. 2, 2020

(30) Foreign Application Priority Data

Sep. 27, 2018  (EP) .................................... 18197045

(51) Int. Cl.
*G01S 5/02* (2010.01)

(52) U.S. Cl.
CPC .......... *G01S 5/0252* (2013.01); *G01S 5/0221* (2013.01); *G01S 5/0242* (2013.01); *G01S 2201/02* (2019.08)

(58) Field of Classification Search
CPC .. G01S 5/0252; G01S 5/02521; G01S 5/0221; G01S 5/0242

USPC ........................................................ 342/451
See application file for complete search history.

(56) References Cited

U.S. PATENT DOCUMENTS

| | | | |
|---|---|---|---|
| 9,980,092 B1* | 5/2018 | Wirola | ................. G01S 5/0252 |
| 2006/0092016 A1 | 5/2006 | Modes et al. | |
| 2016/0161592 A1 | 6/2016 | Wirola et al. | |
| 2018/0242109 A1 | 8/2018 | Wirola et al. | |

FOREIGN PATENT DOCUMENTS

| KR | 2013 0002240 A | 1/2013 |
|---|---|---|
| WO | WO 2005/011321 A1 | 2/2005 |

OTHER PUBLICATIONS

Extended European Search Report for Application No. 18 19 7043 dated Apr. 2, 2019, 9 pages.

* cited by examiner

*Primary Examiner* — Harry K Liu
(74) *Attorney, Agent, or Firm* — Alston & Bird

(57) ABSTRACT

A method includes obtaining or holding available a radio map that has been determined based on radio node observation data of radio signals emitted from radio nodes of a radio node network. The method obtains asset observation data of one or more radio signals that have been emitted from an asset and observed by radio nodes of the radio node network. The method also determines a position estimate of the asset based on the asset observation data and the radio map. A corresponding system is also disclosed.

20 Claims, 8 Drawing Sheets

DETERMINING A POSITION ESTIMATE OF AN ASSET

CROSS-REFERENCE TO RELATED APPLICATIONS

This application claims priority to European Application No. 18197045.0, filed Sep. 27, 2018, the entire contents of which are incorporated herein by reference.

FIELD OF THE DISCLOSURE

The invention relates to the field of positioning, in particular the positioning of an asset, such as personal belongings at home, by observing radio signals emitted by the asset, specifically for implementation with smart home assistants, so that a user may be enabled to easily find the asset.

BACKGROUND

Indoor positioning requires novel systems and solutions that are specifically developed and deployed for this purpose. The "traditional" positioning technologies, which are mainly used outdoors, i.e. satellite and cellular positioning technologies, cannot deliver such performance indoors that would enable an equally well position determination. The typically required positioning accuracy of 2 or 3 meters, a nearly complete coverage of approximately 100% and reliable floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years e.g. solutions based on pseudolites (GPS-like short-range beacons), ultra-sound positioning, BTLE signals and WiFi fingerprinting. What is typical to these solutions is that they require either deployment of totally new infrastructure (beacons, tags and so on) or manual exhaustive radiosurveying of the buildings including all the floors, spaces and rooms.

Indoor positioning solutions typically need to 1) be globally scalable, 2) have low maintenance and deployment costs, and 3) offer acceptable end-user experience. Optimally, the solution is based on an existing infrastructure in the building and/or on existing capabilities in the consumer devices. This leads to the conclusion that the indoor positioning is optimally based on technologies that are already supported in typical end user devices (e.g. in every smartphone, tablet, laptop and even in the majority of the feature phones), such as WiFi- and/or Bluetooth (BT)-technologies. It is, thus, required to find a solution that uses such radio signals in such a way that makes it possible to achieve a sufficient horizontal positioning accuracy, close to 100% floor detection with the ability to quickly build the global coverage for this approach.

One approach for radio-based indoor positioning models e.g. the WiFi-radio environment (or any similar radio environment e.g. Bluetooth) from observed Received Signal Strength (RSS)-measurements as floor specific 2-dimensional radio map and is hereby able to capture the dynamics of the indoor radio propagation environment in a compressable and highly accurate way. This makes it possible to achieve unprecedented horizontal positioning accuracy with the WiFi-signals within the coverage of the created radio maps and also gives highly reliable floor detection.

The described positioning approach can basically function either in a "device-based" or offline mode or in a "device-assisted" or online mode. The modes basically differ in where the position estimate is calculated. In the device-based approach the device has all the information necessary to calculate its own position. This makes sense e.g. in mobile phones, where primarily the mobile device's user is interested in location information. In the other case, i.e. in the device-assisted mode, the device only makes the appropriate observations or measurements, e.g. signal strength measurements, and then sends them to another entity, e.g. a remote server, for calculating the position estimation. This makes sense in cases where the entity to be located does not need to be location-aware itself (e.g. in an asset tracking use case, where the entity is an asset), but the point is that the others know, where the entity is. Moreover, in the device-assisted case the entity itself does not need to have intelligence—it just needs to make observations/take the measurements and send them forwards. The approaches described above can be considered "device-centric" approaches, as in each case the device at least has to perform respective observations or measurements.

In addition to the described device-based and device-assisted modes, another approach is to provide the possibility to perform a "network-centric" positioning. In that case, the network itself performs the necessary observations or measurements. This is in contrast to the device or mobile-centric positioning approach, in which the device itself performs measurements. In such a network-centric setup, entities of the network (e.g. hubs) receive e.g. respective radio signals (e.g. Bluetooth signals) from relatively simple tags. The advantage is that such tags are inexpensive and have a long battery life, which may be ideal for a variety of use cases. The network hubs then relay the observations or measurements on these signals e.g. to a positioning server, possibly via an aggregating auxiliary server. Now, when multiple hubs measure signals from such a tag, the tag position can be estimated, provided that the hub locations are known. Positioning methods which may be applied in such a case may include triangulation (provided that the hubs have directional antennas) and/or trilateration (provided that the tag-hub distance can be measured e.g. via pathloss estimate or a timing measurement).

However, the network-centric approach described above also has a downside. When it comes to network-centric positioning, specifically the pathloss-based trilateration is highly inaccurate. This is because the signal attenuation indoors does not follow the textbook formula of a steady logarithmic decline. Rather the radio field is much more complicated and complex due to the structures and obstacles indoors. Therefore, it would be necessary for the network-centric positioning system to also take advantage of angular information in addition to the pathloss estimate. While this can be realized by having antenna arrays in the hubs, this not only increases the system cost but also makes the deployment more challenging, because now also the orientation of the hub becomes critical.

The above described issues arise for practically every use case of such a positioning system. For instance, the smart home concept has, amongst other things, brought digital assistants to the home environment. Example realizations of such assistants are the Amazon Echo and the Google Home. Such devices can be integrated to many home appliances to control e.g. lighting and heating. While the assistants are unable to locate objects (such as lost keys), this problem may be solved by attaching tags (e.g. a small Bluetooth tag) to a respective asset, such as keys, and deploying a network-centric positioning system at home. However, as discussed above, the network-centric approaches suffer from inaccuracies and/or a complicated deployment process.

SUMMARY OF SOME EMBODIMENTS OF THE INVENTION

It is thus an object of the invention to mitigate at least some of the problems described above. Particularly, embodiments of the invention provide a positioning method which achieves an improved positioning accuracy at low deployment costs with an easy setup. Embodiments of the invention may in particular provide an improved method for positioning of an asset, such as personal belongings at home, by observing radio signals emitted by the asset, specifically for implementation with smart home assistants, so that a user may be enabled to easily find the asset.

According to a first exemplary aspect of the invention, a method is described, performed by at least one apparatus, the method comprising:
  obtaining or holding available a radio map, the radio map having been determined based on radio node observation data of radio signals emitted from radio nodes of a radio node network;
  obtaining asset observation data of one or more radio signals, the one or more radio signals having been emitted from an asset and observed by radio nodes of the radio node network;
  determining a position estimate of the asset based on the asset observation data and the radio map.

The method may in particular be performed and/or controlled by an apparatus according to the exemplary aspects of the invention, as described further below. The apparatus may in particular be a virtual assistant, smart home device or a server.

According to a second exemplary aspect of the invention, a further method, performed by a system, is described, the system comprising:
  at least one apparatus,
  an asset, and
  a radio node network comprising radio nodes,
  the method comprising:
  emitting, by radio nodes of the radio node network, radio signals;
  determining, by the at least one apparatus, a radio map based on radio node observation data of the radio signals emitted from radio nodes of the radio node network;
  emitting, from the asset, one or more radio signals;
  observing, by radio nodes of the radio node network, the one or more radio signals emitted from the asset;
  obtaining, at the at least on apparatus, asset observation data of the one or more radio signals emitted from the asset and observed by radio nodes of the radio node network;
  obtaining, at the at least one apparatus, a request for determining a position of the asset;
  determining, by the at least one apparatus, a position estimate of the asset based on the radio observation data and the radio map; and
  outputting, by the at least one apparatus, the determined position estimate of the asset.

The method may in particular be performed and/or controlled by a system comprising apparatuses according to the exemplary aspects of the invention, as described further below. The at least one apparatus may in particular be a virtual assistant, smart home device and/or a server. Therein, the at least one apparatus may be considered as a part of or at least in communication with the radio node network.

According to the different exemplary aspects of the invention an apparatus is disclosed, comprising means for performing a method according to a respective exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

Thus, an exemplary apparatus according to any aspect may in particular comprise at least one processor and at least one memory including computer program code; the at least one memory and the computer program code configured to, with the at least one processor, cause the apparatus to at least perform a method according to a respective exemplary aspect of the invention.

The above-disclosed apparatuses according to any aspect of the invention may for instance be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance respective means, a processor, a memory, or it may further comprise one or more additional components.

According to the different exemplary aspects of the invention, a system is also disclosed, the system comprising at least one apparatus, an asset, and a radio node network with radio nodes, the system being configured to perform the method of any exemplary aspect of the invention.

According to the different exemplary aspects of the invention, a computer program code is also disclosed, the computer program code, when executed by a processor, causing at least one apparatus to perform a method according to the respective exemplary aspect of the invention.

The computer program may be stored on a computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to the different exemplary aspects of the invention, a (non-transitory) computer readable storage medium, is also disclosed, in which computer program code is stored, the computer program code causing at least one apparatus to perform when executed by a processor a method according to a respective exemplary aspect of the invention. The storage medium may be a tangible storage medium, for example a tangible computer-readable storage medium, e.g.

as described above. The storage medium may be a storage medium of a mobile device, for example an apparatus according to the exemplary aspects of the invention.

In the following, exemplary features and exemplary embodiments of all aspects of the present invention will be described in further detail.

The exemplary aspects of the invention described herein have the advantageous effect, that the location of an asset, which emits one or more radio signals (e.g. either by having associated a (separate) radio tag to the asset or by an integral radio emitter of the asset), can achieve an improved accuracy and/or a facilitated deployment process of the respective radio network compared to typically employed network-centric approaches. This effect will be explained in the following.

First, since the described exemplary aspects of the invention rely on asset observation data of one or more radio signals, which have been emitted from the asset itself, the described aspects do not need to rely on a device-based or device-assisted, i.e. a device-centric, solution. As a device-centric approach always requires certain additional or advanced processing capabilities in the device for taking and reporting radio observations, this increases the power consumption. In contrast, the exemplary aspects of the invention in turn allow the asset or the attached radio tag thereof to be as small as possible and/or to allow the battery life to last very long. Specifically, in the described aspects of the invention, the asset or the attached tag can be very simple and inexpensive, as it only needs to emit e.g. a short radio burst, say, every minute. Thus, the power consumption is very low and the asset or tag can be kept small and long-lasting. Thus, the described exemplary aspects of the invention can be considered optimal for e.g. tracking an asset in a building.

However, as it has already been explained, network-centric approaches typically suffer from increased inaccuracies, complicated deployment or both compared to the device-centric approaches, utilizing a radio map, in which the to be located device itself performs radio measurements, which are compared to the radio map of the area in order to estimate the device location.

In order to overcome this drawback, the described exemplary aspects of the invention follow the idea of on the one hand obtaining asset observation data of one or more radio signals having been emitted from an asset and observed by radio nodes of the radio node network (similar to a network-centric approach) and on the other hand, at the same time, rely on a radio map, which has been determined based on radio node observation data of radio signals emitted from radio nodes of a radio node network (similar to a device-centric approach).

In other words, the technical challenges described above are mitigated by implementing a "network- and device-centric hybrid". The idea is that one can take advantage of the symmetry or time-reversal property of the Maxwell equations. This means that the electromagnetic waves (i.e. the respective radio signals) behave the same, independent of whether the wave is moving forwards or backwards, which is equivalent to changing the direction of time. In practice this means in particular, that e.g. the pathloss of a radio signal between two devices A and B is the same when A transmits and B receives or when B transmits and A receives. Accordingly, it is possible to use a radio map, which has been determined based on radio node observation data of radio signals emitted from radio nodes of a radio node network in combination with asset observation data of one or more radio signals having been emitted from an asset (instead of signals having been emitted from the radio nodes of the network as for generating the radio map).

In this way, an increased accuracy of the position estimate of the asset can be achieved, even without the need for e.g. an antenna array or multiple antennas in the respective radio nodes of the radio network, which reduces both, costs and complexity of deployment of the radio nodes of the radio node network.

An asset may in particular be understood as a portable asset, which often changes its location (e.g. in a home), such as keys or a remote control or other personal belongings. As already explained, that the asset emits a signal is understood to mean, that either an integral or internal part of the asset can emit a respective radio signal or that a tag associated therewith (e.g. attached to or combined with the asset) can emit a respective radio signal. Thus, the tag can be considered as a part of the asset. In any case, the radio signals leading to the asset observation data are digitally associated or associable with the respective asset (e.g. because the radio signal comprises an identifier which is associated with the asset, which may have been done e.g. manually before). Thus, in the present context, the radio signal may only need to come from a somewhere physically close enough to the asset to be considered to be emitted by the asset.

The radio map may be determined (e.g. generated) in a separate training or set up process, for instance. As an example, the radio nodes may (e.g. simultaneously or alternately) emit respective radio signals, which may then be observed by a probing device in order to obtain respective radio node observation data for different locations (in combination with a respective location estimate of the location at which the respective radio node signal was observed, e.g. based on WiFi measurements, GNSS data and/or motion sensor data of the probing device) in the coverage area of the radio node network. Such a probing device may for instance be an end user device (e.g. a smart phone) capable of receiving the respective type of radio node signals. Based on this radio node observation data, a respective apparatus can then determine the radio map.

After the asset has emitted the one or more radio signals, these radio signals can be observed by radio nodes of the radio network. This leads to asset observation data, which may at some point be obtained (e.g. after being relayed over one or more radio nodes of the radio network) at an apparatus, which also has access to the radio map.

This allows a determining, by the apparatus, a position estimate of the asset based on the radio observation data and the radio map. The position estimate may then be output, by the same or a different apparatus.

Generally, the radio node and asset observation data is understood to be observation data, which is based on radio signals emitted by the respective entity, i.e. the radio node and the asset, respectively.

Examples of such observation data of radio signals may be one or more radio measurements of radio signals emitted by a respective entity. For instance, such a radio measurement may contain one or more of the following:
  a global or local identifier of the respective entity (e.g. of the respective radio node or asset, e.g. the BSSIDs, typically the MAC address, and/or the SSIDs in case of a WiFi radio node),
  a signal strength estimate (e.g. received signal strength index, physical Rx level in dBm ref 1 mW, etc.),
  a pathloss estimate, and/or
  a timing measurement (e.g. Round-Trip Time and/or Timing Advance).

The radio node network and/or the asset may employ various radio technologies. Specifically the radio nodes of the radio node network and/or the asset may employ a cellular or non-cellular radio technology (i.e. be an entity of a cellular or non-cellular communication system or network).

Examples of a cellular communication system or network are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication system or network.

Examples of a non-cellular communication system or network are a WLAN (e.g. a WiFi or IEEE 802.11) system, a Bluetooth (LE) system, a ZigBee system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

More generally, a cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties.

Apart from such communication interface, a respective radio node may also equipped with other sensors like a temperature sensor, a light sensor, or a CO sensor and be at the same time used, if required or desired, for monitoring conditions within the respective area or building using the same infrastructure.

According to an exemplary embodiment of the different aspects of the invention, the asset is a portable asset. Portable assets are generally prone to be dislocated or displaced, specifically without the owner or user remembering where the asset was put. This may be specifically be the case for a assets at home or at the workplace. A portable asset may be understood as something which can be carried by a person, for instance.

Examples of portable assets are a key, a key bundle, a jacket, a cycling helmet or a tool. Such assets typically do not have the ability of emitting radio signals. Accordingly, such assets may be (physically) associated with a respective radio tag (e.g. by attaching, fixing, combining or putting into). The radio tag may be a radio tag in compliance with any of the radio technologies mentioned above (e.g a Bluetooth (LE) radio tag, a ZigBee radio tag, a RFID (e.g. NFC) tag etc.).

Other (portable) assets may be a (Bluetooth) headset or a (Bluetooth enabled) remote control, for instance. Such assets are already capable of emitting radio signals. Thus, such assets would not need to be (physically) associated with a radio tag (which is of course nevertheless possible), but could alternatively be configured (e.g. via software) to use an internal radio emitter for emitting respective radio signal for the positioning purpose described herein.

Consequently, according to an exemplary embodiment of the different aspects of the invention, the asset, for emitting the one or more radio signals, comprises a radio tag (physically and/or digitally) associated or associable with the asset and/or an integrated radio emitter. In each case, this allows positioning of a variety of assets independent of their nature.

According to an exemplary embodiment of the different aspects of the invention, the radio signals emitted from the asset are emitted automatically and repeatedly. This allows for the asset or the respective tag to be designed small and power-efficient, as for instance no receiver would need to be integrated into the asset or the tag. For instance, the radio signals may be emitted periodically. For instance, the radio signals may be emitted every few seconds or minutes (e.g. every n seconds or minutes with n being a natural number, e.g. 1, 2, 3, 4, 5 or more). For instance, a single radio signal or a burst of radio signals may be emitted automatically and repeatedly.

According to an exemplary embodiment of the different aspects of the invention, the radio network is a mesh radio network. A (wireless) mesh network is understood to be a communication network made up of radio nodes organized in a mesh topology. Consequently, a mesh network (or simply meshnet) is in particular understood to be a local network topology in which the infrastructure radio nodes (e.g. hubs, bridges, switches or other infrastructure nodes) connect directly, dynamically and non-hierarchically to as many other nodes as possible and cooperate with one another to efficiently route data through the network. The lack of dependency on one radio node allows for every radio node to participate in the relay of information. Preferably, the mesh network dynamically self-organizes and self-configures, which can reduce installation overhead. The ability to self-configure enables dynamic distribution of workloads, particularly in the event that a few nodes should fail. This in turn contributes to fault-tolerance and reduced maintenance costs. Thus, the mesh radio network is also robust, because there is no single point of failure assuming that each node sees more than one other node. Also, the gateway node can be duplicated to enhance robustness Accordingly, one radio node can (directly) communicate with at least one other node of the radio node network. However, typically not all nodes can (directly) communicate with each other, even though this may be possible for small network coverage areas.

As an example, the mesh radio nodes may be deployed to a home or to a factory. A mesh radio node may communicate with the nearby nodes to relay messages containing respective asset radio observation data. The mesh radio nodes may relay these messages to the subsequent mesh radio nodes e.g. randomly. The target may be to relay the message to a specific target entity or target radio node of the mesh radio network (e.g. a gateway node or "sink"), which gathers the messages for further use. This entity may in particular be the apparatus or one of the at least one apparatus performing example embodiments of the method according to the exemplary aspects of the invention. In case of such a more-or-less random nature of messaging, this target entity might receive the same message multiple times (relayed through different paths). However, as each message preferably contains a unique identifier, any messages with the same identifier arriving after the first one at the target entity can be omitted.

Another advantage of deploying such mesh radio nodes forming a mesh network is that there is no need to deploy other connectivity mechanisms, such as an additional WiFi or cellular network. Also, it is generally possible for the mesh radio nodes to be moved and as long as a node can communicate with at least one another node, the messages can be relayed to the gateway node. However, such a process may require to again survey the area and to update or re-determine the radio map of the area, because the radio map is determined based on radio node observation data of radio signals emitted from radio nodes of a radio node network, as explained above.

To ensure static radio environment, it is preferred that the radio nodes are not moved after the setup process. For this reason, the radio nodes may be equipped with motion sensors. If motion is detected, the radio node may send a message via the radio network and the apparatus (e.g. server or smart home device) may notify the user that the radio node shall not be moved or has been moved and that the radio environment must be re-surveyed.

Further, the radio nodes may also periodically send their health status (e.g. a battery charge state) over the radio network to the at least one apparatus. The at least one apparatus may then inform the user on the need to replace a respective battery.

Consequently, according to an exemplary embodiment of the different aspects of the invention, the method further comprises:
relaying asset observation data from radio nodes of the radio node network to a target entity in the radio node network.

As explained above, the asset observation data may be relayed from radio node to radio node until the target entity is reached, which target entity may be considered a "sink", which may not relay any messages. The target entity may be the apparatus or one of the at least one apparatus performing the respective method. For instance, the target entity may be a smart home device or the like, as explained further below.

According to an exemplary embodiment of the different aspects of the invention, the radio nodes of the radio network are anchor-beacons comprising a beacon functionality for emitting radio signals for determining the radio map and an anchor functionality for observing radio signals emitted from the asset.

The beacon functionality of the anchor-beacons may for instance be used at least for emitting radio signals, so that corresponding radio node observation data can be observed and collected, e.g. by a probing device as explained above. However, the beacon functionality of the anchor-beacons may also be used in the process of relaying messages, e.g. for sending asset observation data observed by this or other anchor-beacons of the radio node network.

The anchor functionality of the anchor-beacon may for instance be used at least for observing radio signals emitted from the asset, so that corresponding asset observation data can be obtained and collected by the radio nodes. However, the anchor functionality of the anchor-beacons may also be used in the process of relaying messages, e.g. for receiving asset observation data observed by other anchor-beacons of the radio node network.

According to an exemplary embodiment of the different aspects of the invention, the at least one apparatus performing the method comprises one or more of the following:
a server;
a cloud server;
an apparatus with virtual assistant capability;
a smart home device; and/or
a smart speaker.

A server may be a physical (remote) server or a virtual server operated in a cloud (cloud server), such as e.g. AWS or Azure. A virtual assistant may be a software, software module or software agent that can perform tasks or services for an individual. Such a service may be provided by a certain apparatus or device, in particular by a device specifically designed to be used at home, which device may then be termed a "smart home device". A particular user-friendly way for interaction with a virtual assistant, particular for the case of determining positions of assets, may be allowed by a smart speaker. A smart speaker may be understood to be a type of (wireless) speaker and voice command device with an integrated virtual assistant (i.e. artificial intelligence) that offers interactive actions and handsfree activation, often with the help of one or more activation word(s) (so called "hot words"). Typically, a smart speaker can also act as a smart device that utilizes a wireless protocol standard (e.g. Wi-Fi or Bluetooth) to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. A smart speaker may also include a screen to show the user a visual response.

The at least one apparatus may generally also comprise a combination of an apparatus with virtual assistant capability (e.g. a smart home device or smart speaker) and a server (e.g. cloud server) in communication with the respective virtual assistant capable device.

In case an embodiment of a method of any aspect of the invention also comprises actions to be performed by one or more radio nodes of the radio network (e.g. emitting respective radio signals, observing radio signals of the asset, relying the asset observation data, emitting), by the asset (e.g. emitting respective radio signals) or by another entity (e.g. a gateway node), the at least one apparatus or system may also comprise such further entities.

According to an exemplary embodiment of the different aspects of the invention, the asset radio observation data of one or more radio signals emitted from the asset and observed by radio nodes of the radio node network comprises one or more of the following:
an identifier of the respective radio signal or asset;
a received signal strength of the respective radio signal;
a pathloss estimate of the respective radio signal;
an angle of arrival of the respective radio signal; and/or
a timing measurement of the respective radio signal.

Specifically, if the observation data comprises a received signal strength of the respective radio signal may have the effect that such data may be determined for any kind of transmitter. It may further have the effect that they may be observed or measured at a receiving end without establishing any connection with the transmitting end. A value relating to a received signal strength of a radio signal may be for instance a received signal strength indication RSSI or a physical Rx level in dBm with a reference value of 1 mW, etc. The same is applicable in case of a path loss estimate of a radio signal at a particular location. However, other possible kinds of observation data such as timing measurements (e.g. a timing advance (TA) value or a round-trip time value) or an angle of arrival (AOA) may also be used.

Preferably, the radio node observation data, which has been used for determining the respective radio map at least comprises the same kind of data, e.g. if the radio node observation used data for determining the radio map e.g. comprises a received signal strength, then the asset observation data at least also comprises a received signal strength.

Even though it is generally possible, that the asset observation data comprises e.g. an angle of arrival of the respective radio signal, it is preferred that the radio nodes of network do not comprises or make use of an antenna array or multiple antennas for making such angular measurements on the radio signals. In this way the costs of the radio nodes can be reduced and the orientation of the radio nodes is not or less critical, so that e.g. the setup of the radio nodes is facilitated. As explained, the exemplary aspects of the invention described herein improve the accuracy even without such angular measurements.

According to an exemplary embodiment of the different aspects of the invention, the determining of a position estimate of the asset based on the asset observation data and the radio map comprises:

based on the asset observation data of one or more radio signals emitted from the asset and observed by radio nodes of the radio node network, determining calculated observation data, which would be observed by the asset for one or more radio signals emitted from radio nodes of the radio node network.

As already explained, due to the symmetry or time-reversal properties of the Maxwell equations, the electromagnetic waves (i.e. the respective radio signals) behave the same, independent of whether the wave is moving forwards or backwards and independent of whether one entity is the transmitter and the other the receiver or the other way around. This allows determining calculated observation data, i.e. observation data which is not based on "real" observations of physical signals, but which is rather calculated or reconstructed. The calculated observation data would have been obtained, if one or more radio signals were emitted from the radio nodes of the radio node network and if the asset, at the very location it is positioned, had observed such radio node signals. This may have the effect that the available radio map and positioning algorithms can be used as usual.

According to an exemplary embodiment of the different aspects of the invention, the determining of the calculated observation data assumes a reciprocity, such that a propagation of radio signals emitted from the asset and observed by radio nodes of the radio node network corresponds to a propagation of radio signals emitted by respective radio nodes of the radio node network and observed by the asset. Accordingly, the calculated observation data of one or more radio signals emitted from the asset and observed by radio nodes of the radio node network corresponds to observation data of one or more radio signals emitted by radio nodes of the radio node network and observed by the asset. This may have the effect that the calculated observation data can efficiently be determined and readily be used in combination with the radio map.

According to an exemplary embodiment of the different aspects of the invention, the determining of the position estimate of the asset comprises:

comparing the calculated observation data with the radio map.

The calculated observation data may be handled as if the calculated observation data was obtained from the observation of real radio signals. For instance, the calculated observation data may be statistically compared with the radio map. The position indicated by the radio map with e.g. the highest likelihood of being the position, at which the calculated observation data would in fact have been obtained if respective signals of the radio nodes of the radio node network could be observed by the asset, may be assumed to be the position of the asset.

According to an exemplary embodiment of the different aspects of the invention, the method further comprises one or more of:

obtaining a request for determining a position of the asset; and/or outputting the determined position estimate of the asset.

The request may be obtained at an apparatus with virtual assistant capability, for instance. The user may preferably use his voice for inputting the request into the respective apparatus. For this, the apparatus may comprise one or more microphones. However, it is generally also possible that another suitable user interface is used for inputting a request, such as a keyboard or a touch display, for instance. The request may be processed (e.g. converting the recorded audio and/or initiating the positioning process) at the apparatus or it may be forwarded to a further apparatus, such as a remote (cloud) server.

After the position estimate of the asset has been determined, the position can be output by the same apparatus, which has received the request, e.g. the apparatus with virtual assistant capability. In case the position is determined at a remote server the determined position estimate may first be forwarded to the respective apparatus with virtual assistant capability of the user and then output. Additionally or alternatively, the determined position estimate may be output visually, e.g. on a display of the apparatus with virtual assistant capability.

It may be the case that not only a radio map but that also an at least partial site map or floor plan is digitally available of the same area. Such a site map or floor plan may e.g. indicate certain physical structures, areas and/or rooms. The site map or floor plan may also indicate names of e.g. locations, floors, rooms and/or structures. Thus, the position estimate determined on the radio map may be compared with the site map or floor plan to obtain further information on the position of the asset. Specifically, this may allow outputting the position estimate of the asset in a way easily understandable for the user (e.g. "the keys are in the living room" or "the jacket is on the first floor near the stairs"). A respective sit map or floor plan may have to be setup or input by the user.

According to an exemplary embodiment of the different aspects of the invention, the method further comprises:

obtaining radio node observation data of radio signals emitted from radio nodes of the radio node network;

determining the radio map based on the radio node observation data of radio signals emitted from radio nodes of the radio node network.

Radio node observation data of radio signals emitted from radio nodes of the radio node network can be used for determining the radio map, as explained. Respective radio node observation data may be obtained by observing the radio signals emitted from the radio nodes of the radio node network (e.g. when the radio nodes use their beacon functionality). As explained, this may be done with a probing device. The radio node observation data may thus be considered to be training or calibrating data. The probing device (which may be a smart phone for instance) may forward the observation data to another apparatus (e.g. a smart home device or a server). Based on this data, the respective apparatus may then determine the radio map. In case a remote server obtained the radio observation data and determines a respective radio map, the server may transfer the radio map back to a device of the user (e.g. the smart home device), so that the position estimate can be determined locally (and offline). Alternatively, the server may also keep the radio map and perform determinations of position estimates at the server and only transfer back the determined position estimate.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description as provided in the above summary section of this specification.

Figure 1:
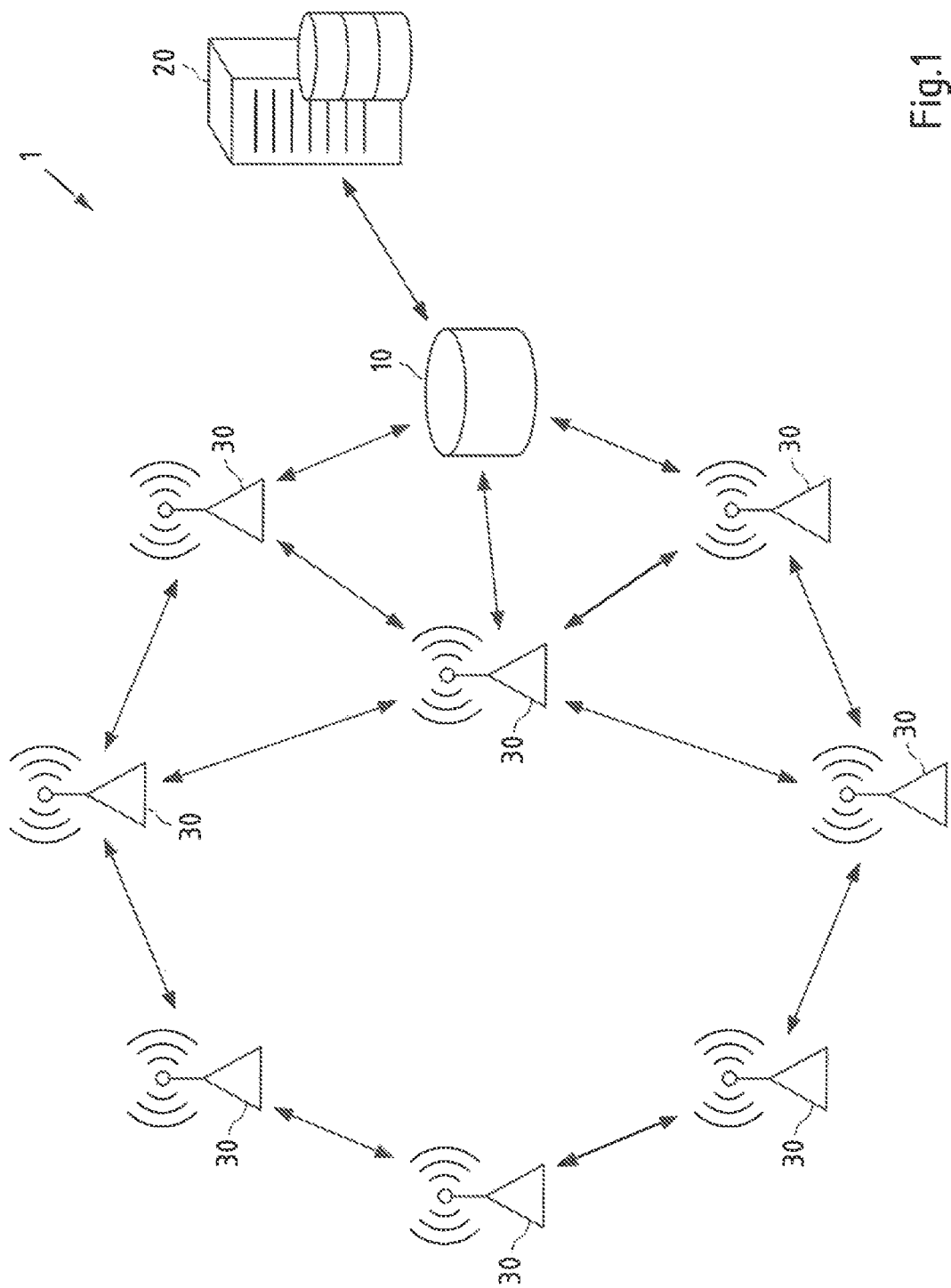
FIG. 1 is a diagram of a system according to an exemplary embodiment of the invention.
Figure 9:
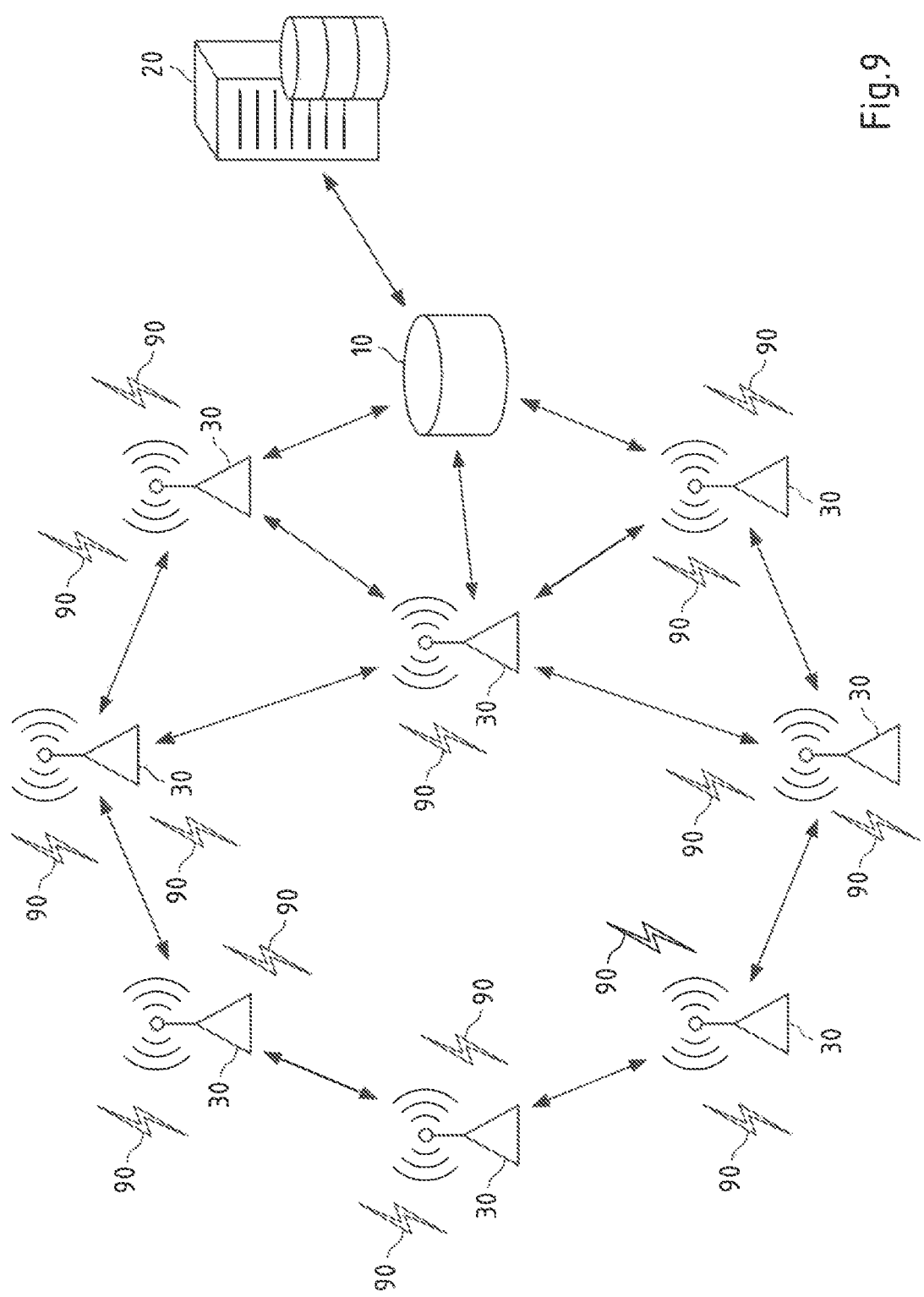
FIG. 9 is a diagram of the system of FIG. 1 illustrating the generation of a radio map by obtaining radio node observation data.
Figure 10:
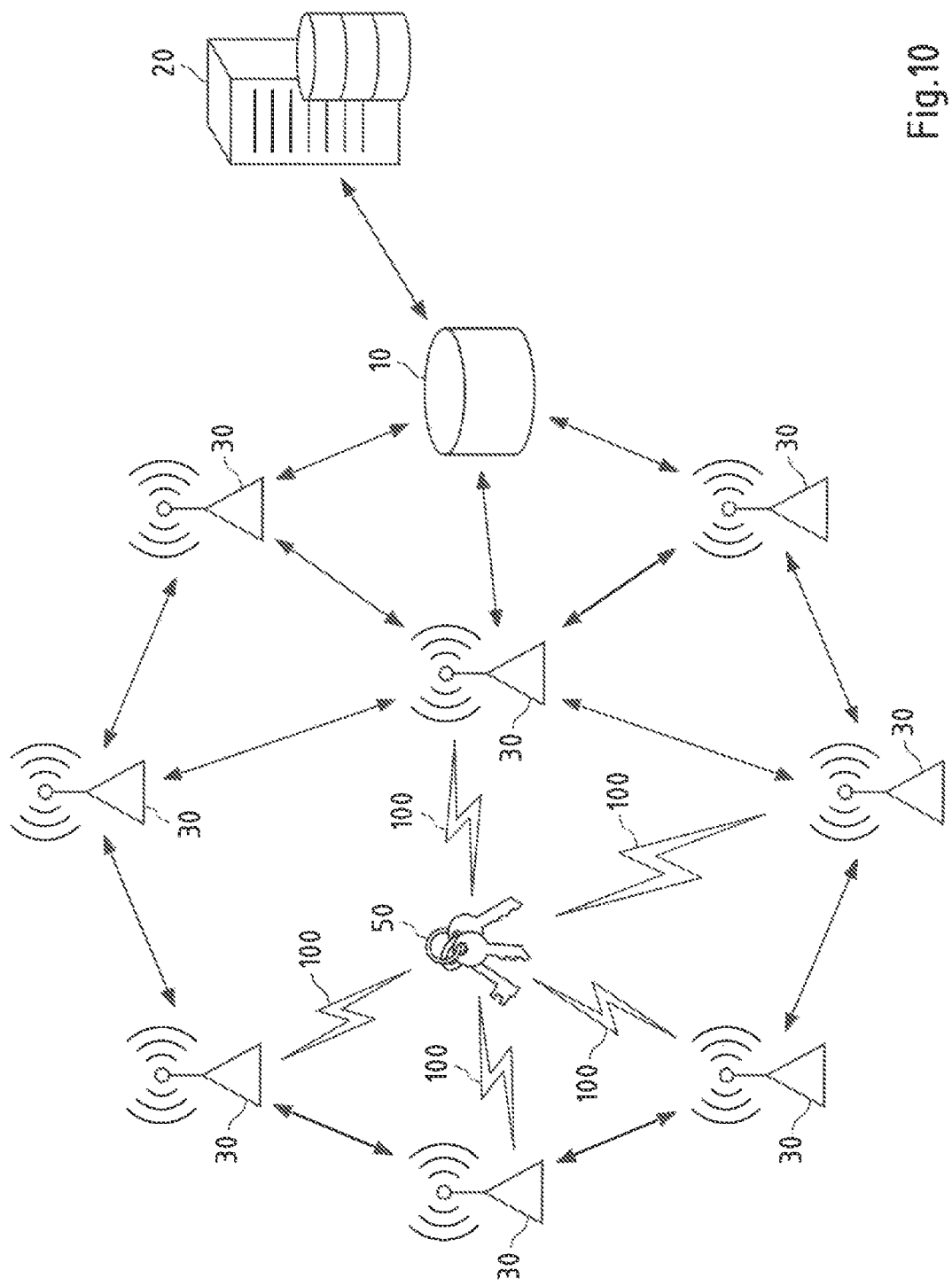
FIG. 10 is a diagram of the system of FIG. 1 illustrating the determination of a position of an asset by obtaining asset observation data.

FIG. 1 is a diagram of a system 1 comprising an apparatus 10 with virtual assistant capability, e.g. a smart home device and more specifically a smart speaker (in the following simply referred to as "smart speaker"). The system 1 further comprises a server 20. Particularly, smart speaker 10 and server 20 may separately or together perform exemplary embodiments of the different aspects of the invention (or at least parts thereof). The system 1 also comprises a radio node network with a plurality of radio nodes 30, in this case mesh radio nodes. The system 1 may also comprise a mobile device 40 (in this case a smart phone) and an asset 50 (in this case a key bundle with radio tag) as shown in FIGS. 9 and 10, respectively.

While the invention will be exemplarily described with respect to a smart speaker 10, a server 20, mesh radio nodes 30, a mobile device 40 and a key bundle with a radio tag as an asset 50, the following explanations are also applicable to other respective exemplary apparatuses mentioned earlier.

Figure 2:
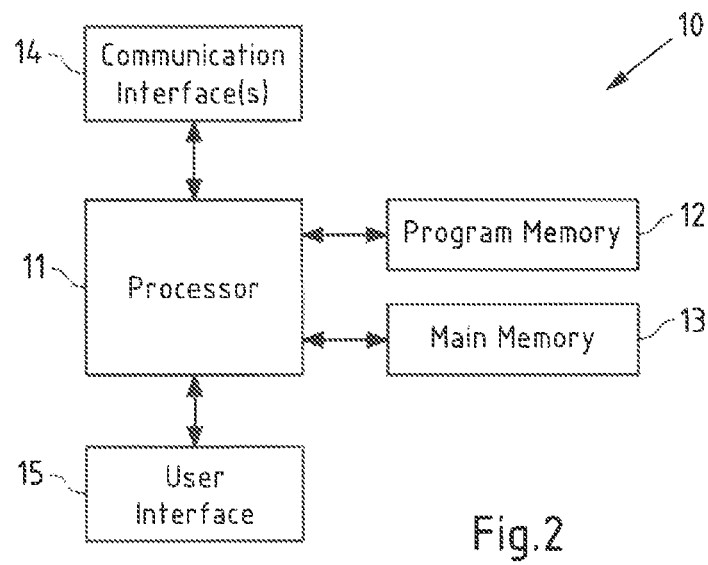
FIG. 2 is a block diagram of the smart home device of FIG. 1 as an example of an apparatus according to the different aspects of the invention.

Turning now to FIG. 2, an exemplary block diagram of smart speaker 10 of FIG. 1 as an example of an apparatus with virtual assistant capabilities is shown. Smart speaker 10 comprises a processor 11. Processor 11 may represent a single processor or two or more processors, which are for instance at least partially coupled, for instance via a bus. Processor 11 may use program memory 12 and main memory 13 to execute a program code stored in program memory 12 (for instance program code causing smart speaker 10 to perform embodiments of the different methods, when executed on processor 11).

Some or all of memories 12 and 13 may also be included into processor 11. One of or both of memories 12 and 13 may be fixedly connected to processor 11 or at least partially removable from processor 11. Program memory 12 may for instance be a non-volatile memory. It may for instance be a FLASH memory, any of a ROM, PROM, EPROM and EEPROM memory or a hard disc, to name but a few examples. Program memory 12 may also comprise an operating system for processor 11. Main memory 13 may for instance be a volatile memory. It may for instance be a RAM or DRAM memory, to give but a few non-limiting examples. It may for instance be used as a working memory for processor 11 when executing an operating system and/or programs.

Program memory 12 may in particular comprise software, a software module or a software agent that enables the smart speaker to be capable of performing tasks or services for the user (virtual assistant), such as taking (voice) requests for determining a position of an asset and returning a (voice) result of the position estimate.

Processor 11 further controls a communication interface 14 configured to receive and/or send information. For instance, the smart speaker 10 may be configured to obtain asset observation data (e.g. from radio nodes 30) and/or radio node observation data (e.g. from mobile device 40). For instance, smart speaker 10 is further configured to communicate and exchange information (e.g. obtained radio node observation data, obtained asset observation data or a radio map) with server 20 of FIG. 1.

The described communication may for instance be based on a (e.g. partly) wireless connection. The communication interface 14 may thus comprise circuitry such as modulators, filters, mixers, switches and/or one or more antennas to allow transmission and/or reception of signals. For instance, communication interface 14 is at least configured to allow communication with a non-cellular and/or cellular communication system, such as for instance to a Bluetooth, ZigBee or WLAN network and/or a 2G/3G/4G/5G cellular communication system.

Processor 11 further controls a user interface 15 configured to present information to a user of smart speaker 10 and/or to receive information from such a user. The user interface 14 comprises, particularly in case of a smart speaker, at least one speaker as output means, in particular for outputting a determined position estimate of an asset, such as asset 50. Also, particularly in case of a smart speaker, the user interface 14 comprises at least one microphone for receiving voice commands from the user, such as a request for determining a position of an asset. In any case, the user interface 14 may also comprise further user interface means, such as a (touch) display or a keyboard.

The components 12-15 of smart speaker 10 may for instance be connected with processor 11 by means of one or more serial and/or parallel busses.

Figure 3:
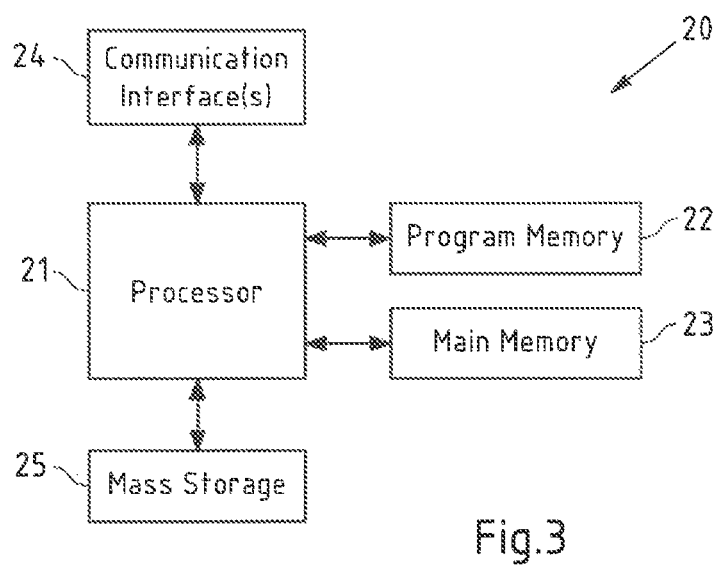
FIG. 3 is a block diagram of the server of FIG. 1 as another example of an apparatus according to the different aspects of the invention.

Turning now to FIG. 3, an exemplary block diagram of a server 20 of FIG. 1 is shown. Server 20 comprises a processor 21. Processor 21 may represent a single processor or two or more processors, which are for instance at least partially coupled, for instance via a bus. Processor 21 may use program memory 22 and main memory 23 to execute a program code stored in program memory 22 (for instance program code causing server 20 to perform embodiments of the different methods, when executed on processor 21). Some or all of memories 22 and 23 may also be included into processor 21. One of or both of memories 22 and 23 may be fixedly connected to processor 21 or at least partially removable from processor 21. Program memory 22 may for instance be a non-volatile memory. It may for instance be a FLASH memory, any of a ROM, PROM, EPROM and EEPROM memory or a hard disc, to name but a few examples. Program memory 22 may also comprise an operating system for processor 21. Main memory 23 may for instance be a volatile memory. It may for instance be a RAM or DRAM memory, to give but a few non-limiting examples. It may for instance be used as a working memory for processor 21 when executing an operating system and/or programs.

Processor 21 further controls one or more communication interfaces 24 configured to receive and/or send information. For instance, server 20 may be configured to communicate with smart speaker 10 of system 1 of FIG. 1. Such a communication may for instance comprise receiving radio node observation data or asset observation data from mobile device 10. Also, server 20 is able to send e.g. a determined radio map or a determined position estimate of an asset, such as asset 50, to smart speaker 10. As already explained, the communication may for instance be based on a (e.g. partly) wireless connection. The communication interface 24 may thus comprise circuitry such as modulators, filters, mixers, switches and/or one or more antennas to allow transmission and/or reception of signals. In embodiments of the invention, communication interface 24 is inter alia configured to allow communication according to a 2G/3G/4G/5G cellular communication system and/or a non-cellular communication system, such as for instance a WLAN network.

Processor 21 further interfaces with a mass storage 25, which may be part of the server 20 or remote from server 20, and which may for instance be used to store one or more databases. For instance, server 20 may store, in a database, collected radio node observation data or asset observation data. Further, server 20 may store in the database determined radio maps.

The components 22-25 of server 20 may for instance be connected with processor 21 by means of one or more serial and/or parallel busses.

Figure 4:
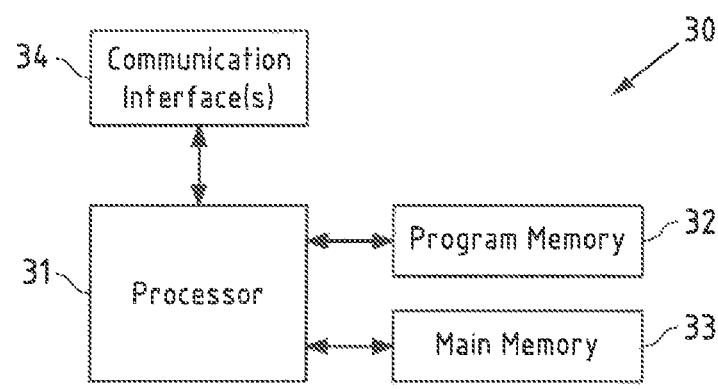
FIG. 4 is a block diagram of a radio node 30 of the radio node network of FIG. 1.

Turning now to FIG. 4, an exemplary block diagram of a radio node 30 of the mesh radio node network of FIG. 1 is shown. Similarly to apparatuses 10 and 20, radio node 30 comprises a processor 31, program memory 32 and main memory 33, which may be designed and configured as already explained with respect to apparatuses 10, 20. Thus, it is referred to the description of apparatuses 10, 20. Specifically, processor 31 may use program memory 32 and main memory 33 to execute a program code stored in program memory 32 (for instance program code providing a beacon and anchor functionality to a respective radio node 30).

Processor 31 further controls one or more communication interfaces 34 configured to receive and/or send information, in particular to broadcast information and to observe radio signals of the environment, such as radio signals emitted from asset 50. Particularly, radio node 30 may be configured to communicate with other radio nodes 30 of the radio node network. Also, radio node 30 may be configured to communicate with smart speaker 10. Such a communication may in each case for instance comprise sending and/or receiving asset observation data. As already explained, the communication may for instance be based on a (e.g. partly) wireless connection. The communication interface 34 may thus comprise circuitry such as modulators, filters, mixers, switches and/or one or more antennas to allow transmission and/or reception of signals. In embodiments of the invention, communication interface 34 is inter alia configured to allow communication according to a 2G/3G/4G/5G cellular communication system and/or a non-cellular communication system, such as for instance a Bluetooth, ZigBee or WLAN network.

The components 32-34 of radio node 30 may for instance be connected with processor 31 by means of one or more serial and/or parallel busses.

Figure 5:
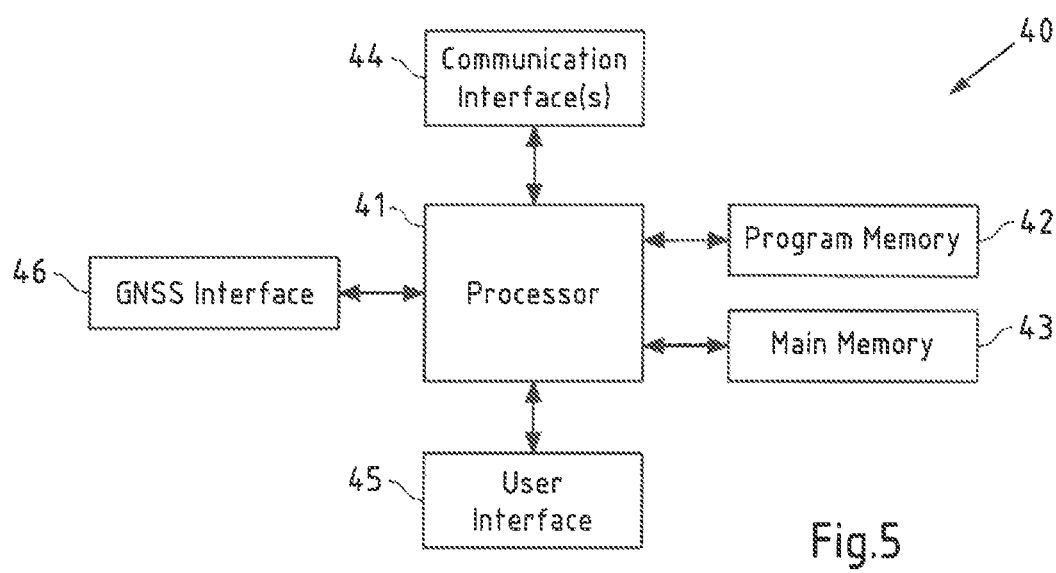
FIG. 5 is a block diagram of the mobile device shown in FIG. 9 as an example of a probing device.

Turning now to FIG. 5, an exemplary block diagram of a mobile device, such as mobile device 40 shown in FIG. 9 is shown. Similarly to apparatuses 10, 20, 30, mobile device 40 comprises a processor 41, program memory 42 and main memory 43, which may be designed and configured as already explained with respect to apparatuses 10, 20, 30. Thus, it is referred to the description of apparatuses 10, 20, 30. Specifically, processor 41 may use program memory 42 and main memory 43 to execute a program code stored in program memory 42 (for instance program code allowing mobile device 40 to observe radio signals of radio nodes 30 and to collect radio node observation data).

Processor 41 further controls a communication interface 44 configured to receive and/or send information. For instance, mobile device 40 may be configured by means of communication interface(s) 44 to observe radio signals of radio nodes 30. Further mobile device may be configured to communicate with smart speaker 10 and/or server 20, in order to send collected radio node observation data. Therein, the described communication may for instance be based on a (e.g. partly) wireless connection. As described before, the communication interface 44 may comprise circuitry such as modulators, filters, mixers, switches and/or one or more antennas to allow transmission and/or reception of signals. For instance, communication interface 44 is at least configured to allow communication according to a non-cellular communication system, such as for instance a Bluetooth, ZigBee or WLAN network, in particular to communicate with smart speaker 10 or server 20. In embodiments of the invention, communication interface 44 may also be configured to allow communication according to a 2G/3G/4G/5G cellular communication system, in particular to communicate with server 20.

Processor 41 further controls a user interface 45 configured to present information to a user of mobile device 40 to receive information from such a user, such as manually input position fixes, a site map or floor plan of the area or the like. User interface 44 may for instance be the standard user interface via which a user of mobile device 40 controls other functionality thereof, such as making phone calls, browsing the Internet, etc.

Processor 41 may further control a GNSS interface 46 configured to receive positioning information of an GNSS such as Global Positioning System (GPS), Galileo, Global Navigation Satellite System (i.e. "Globalnaja Nawigazionnaja Sputnikowaja Sistema", GLONASS) or Quasi-Zenith Satellite System (QZSS). In case of mobile device 40, the positioning information of GNSS interface 46 (potentially in connection with further sensors of mobile device 40, such as inertial sensor, e.g. accelerometer or gyroscope) may be used in order to obtain location estimates in combination with the collection radio node observation data in order to determine a respective radio map.

Figure 6:
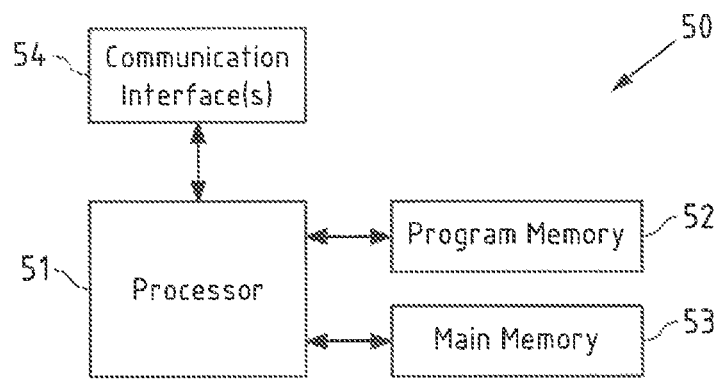
FIG. 6 is a block diagram of a radio tag attached to the key bundle shown in FIG. 10 as an example of an asset.

Turning now to FIG. 6, an exemplary block diagram of an asset with radio tag or of a radio enabled asset, such as asset 50, is shown. Similarly to apparatuses 10, 20, 30, 40, asset 50 comprises a processor 51, program memory 52 and main memory 53, which may be designed and configured as already explained with respect to apparatuses 10, 20, 30 and 40. Thus, it is referred to the description of apparatuses 10, 20, 30 and 40. Specifically, processor 51 may use program memory 52 and main memory 53 to execute a program code stored in program memory 52 (for instance program code making the asset 50 automatically and repeatedly send out radio signals, e.g. "tag positioning ping").

Processor 51 further controls one or more communication interfaces 54 at least configured to send information, in particular to broadcast radio signals which can be observed by the radio nodes 30 of the radio node network in order to obtain asset observation data. However, communication interface(s) 54 may also allow asset 50 to receive information, e.g. for a set up process. In embodiments of the invention, communication interface 54 is inter alia configured to allow communication according to a 2G/3G/4G/5G cellular communication system and/or a non-cellular communication system, such as for instance a Bluetooth, ZigBee or WLAN network.

The components 52-54 of asset 50 may for instance be connected with processor 51 by means of one or more serial and/or parallel busses.

Figure 7:
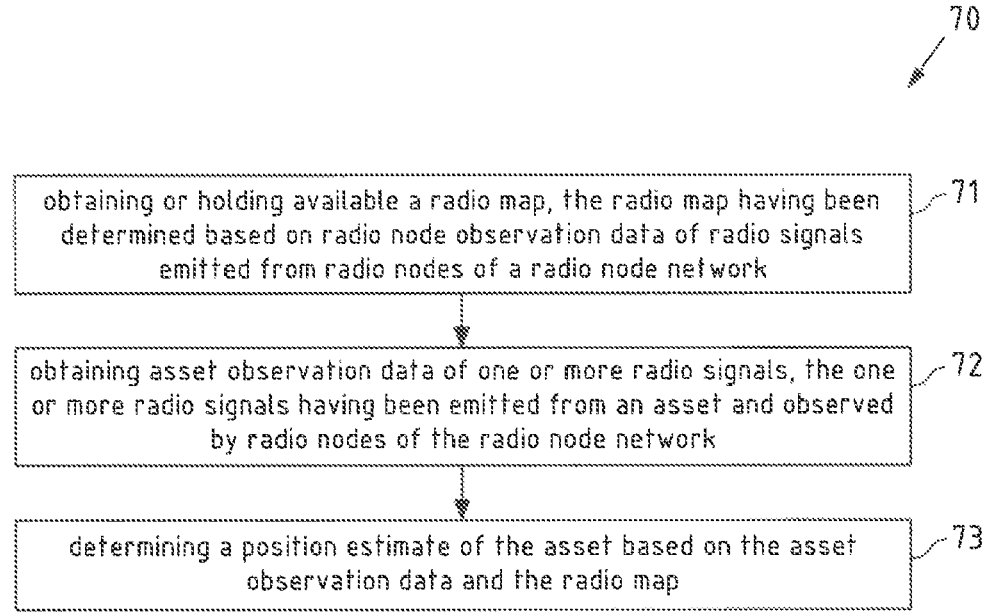
FIG. 7 is a flow chart illustrating an example of a method according to the first aspect of the invention.
Figure 8:
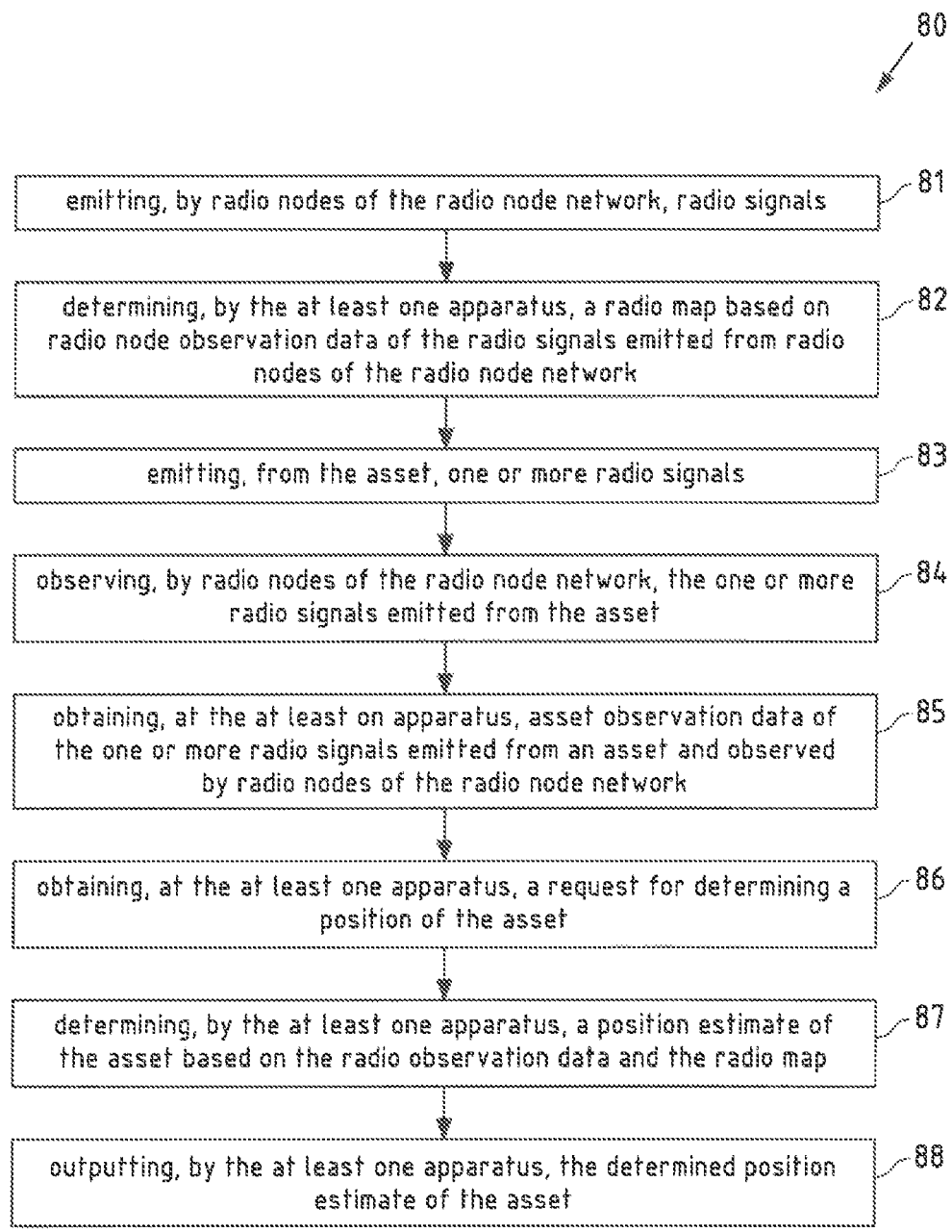
FIG. 8 is a flow chart illustrating an example of a method according to the second aspect of the invention.

The methods of the different aspects will now be described in more detail with respect to FIG. 7-10. Therein, FIG. 7 is a flow chart 70 illustrating an example of a method according to the first aspect of the invention, while FIG. 8 is a flow chart 80 illustrating an example of a method according to the second aspect of the invention.

Generally, the described methods may allow enabling voice-guided home assistants or other smart home devices to answer questions about lost assets or items.

First, radio nodes 30 (in this case Bluetooth anchor-beacons) are deployed in the building. All the radio nodes 30 of the radio node network emit radio signals (action 81). For instance, the beacon functionality in anchor-beacons may broadcast Bluetooth advertisement signals periodically e.g. every second, usually in all directions. This broadcast provides the radio field that mobile-based/assisted solutions typically use for positioning. This process is depicted in FIG. 9, illustrating the radio signals 90 emitted by radio nodes 30, producing a complex radio environment. The radio environment is surveyed e.g. manually by mobile device 40 depicted in FIG. 9, which receives the radio signals 90 emitted by radio nodes 30. Thus, for different locations mobile device 40 obtains radio node observation data (e.g. a received signal strength for each radio node) and a respective location estimate (e.g. based on GNSS, Wi-Fi measurements, motion sensors and/or manual user inputs). This information may be forwarded to the smart speaker 10 and/or server 20.

Apart from the use case of locating an asset as described herein, the radio map can advantageously also be used in a usual device-based ore device assisted approach for locating a mobile device, for instance.

Smart speaker 10 or server 20 then determines a radio map based on radio node observation data of the radio signals 90 emitted from radio nodes 30 of the radio node network (action 82). The radio map may be a radio map for the building, for instance. In case the radio map is calculated by server 20, the radio map may be downloaded to the smart speaker 10 to be assistant-resident. Alternatively, the radio map on the server 20 may be accessed remotely by the smart speaker 10 via cloud services. In any case, the radio map can be obtained or hold available (action 71).

Now, the case depicted in FIG. 10 is considered, in which a user requests the position of the asset 50, in this case a key bundle.

For this, in a previous setup phase, naturally each asset to be located must physically and digitally associated or combined with a respective radio tag (as long as the asset is not by itself able to emit appropriate radio signals). For instance, the radio tag may have a machine-readable identifier and the server 10 or smart speaker 20 must be able to associate the identifier with the correct asset (e.g. the identifier of radio tag of asset 50 with "my keys").

Irrespective of the request, the asset 50 repeatedly and automatically emits periodical positioning bursts of radio signals 100, also referred to as positioning ping, action (83), which is sent e.g. every minute or even more infrequently to save battery life. In this case a Bluetooth tag has been attached to the asset 50 in order to enable this functionality of the asset 50. Alternatively, an existing Bluetooth radio in different types of devices in smart homes, such as Bluetooth headsets, remote controls etc. can be configured to send such positioning burst periodically.

By means of the anchor functionality of the radio nodes 30, the radio signals 100 emitted from the asset 50 are observed by one or more of the radio nodes 30 of the radio node network (action 84). The radio nodes 30 are in this case Bluetooth anchor-beacons forming a mesh radio network. For instance, the radio nodes 30 can extract an identifier from the radio signals 100 (the identifier having been digitally associated with the asset, as explained above) and measure received signal strengths of the radio signals 100. By this, the radio nodes 30 obtain asset observation data and forward the asset observation data to smart speaker 10 or server 20. From an architectural viewpoint the smart speaker 10 works as the sink in the mesh radio network to which the mesh messages terminate. The smart speaker 10 may be directly connected to the Internet so no specific gateway node is required. The mesh radio network may function on the basis of a Bluetooth standard (e.g. Bluetooth 5.0 specification or higher). In any case, asset observation data of the one or more radio signals 100 emitted from the asset 50 and observed by radio nodes 30 of the radio node network is obtained (actions 72, 85).

At the smart speaker 10 or server 20, a respective request for determining the position of the asset 50 is obtained (action 86), which may be a voice command be the user.

Based on the radio observation data and the radio map a position estimate of the asset 50 can be determined by the smart speaker 10 or the server 20 (actions 73, 87).

This is possible, because, by reciprocity, the pathloss over the path between the asset 50 and an anchor-beacon 30 is the same no matter which way the radio signal goes. Therefore, the signal strength measured by the anchor-beacon 30 is the same as the asset would have measured it for the broadcast originated from the anchor-beacon 30. Collecting the asset observation data (e.g. positioning burst signal strength measurements) from all the anchor-beacons 30, that observed the radio signals 100 of the asset 50, allows reconstructing how the asset 50 would have observed the radio environment created by the radio signals 90 of the radio nodes 30.

Therefore, the smart speaker 20 or server 10 now has both, the (indoor) radio map as well as the reconstruction of how the asset 50 would see the radio signal environment 90 created by the radio nodes 30. Again, the logic behind this is that the radio nodes 30 measure the signals 100 of the asset 50, and by the reciprocity, this corresponds to how the asset 50 would observe the radio node signals 90. Thus, the smart speaker 20 or server 10 is able to locate the asset. The smart speaker 20 or server 10 does this for instance by statistically comparing the radio map with the reconstructed or calculated observation data. The result of the comparison is an estimate of the asset position.

The determined position estimate of the asset 50 may be output by the smart speaker 10 as an audible output or in any other suitable form. For instance, the smart speaker may, alternatively or in addition to the voice output, also have a display for displaying the asset position on a site map or floor plan.

For this, a respective site map or floor plan must be available, of course. For instance, the user may have created a site map or floor plan (i.e. a "real" map, not a radio map) for the respective area (e.g. their home), for instance by using CAD drawings of the building. In that case a semantic meaning may also be given to different places, e.g. names of different rooms and spaces and important places of interest like refrigerator or TV. This enables a more natural guidance and voice responses of the smart speaker 20, when outputting the position estimate of asset 50.

In the above example, the smart speaker 20 was described to reside locally, e.g. in the home premises. While this may be an optimal location to perform the position estimation, the asset position may nevertheless still be queried remotely. The system would then simply access the asset position estimate remotely from the home-based smart speaker, for instance.

Figure 11:
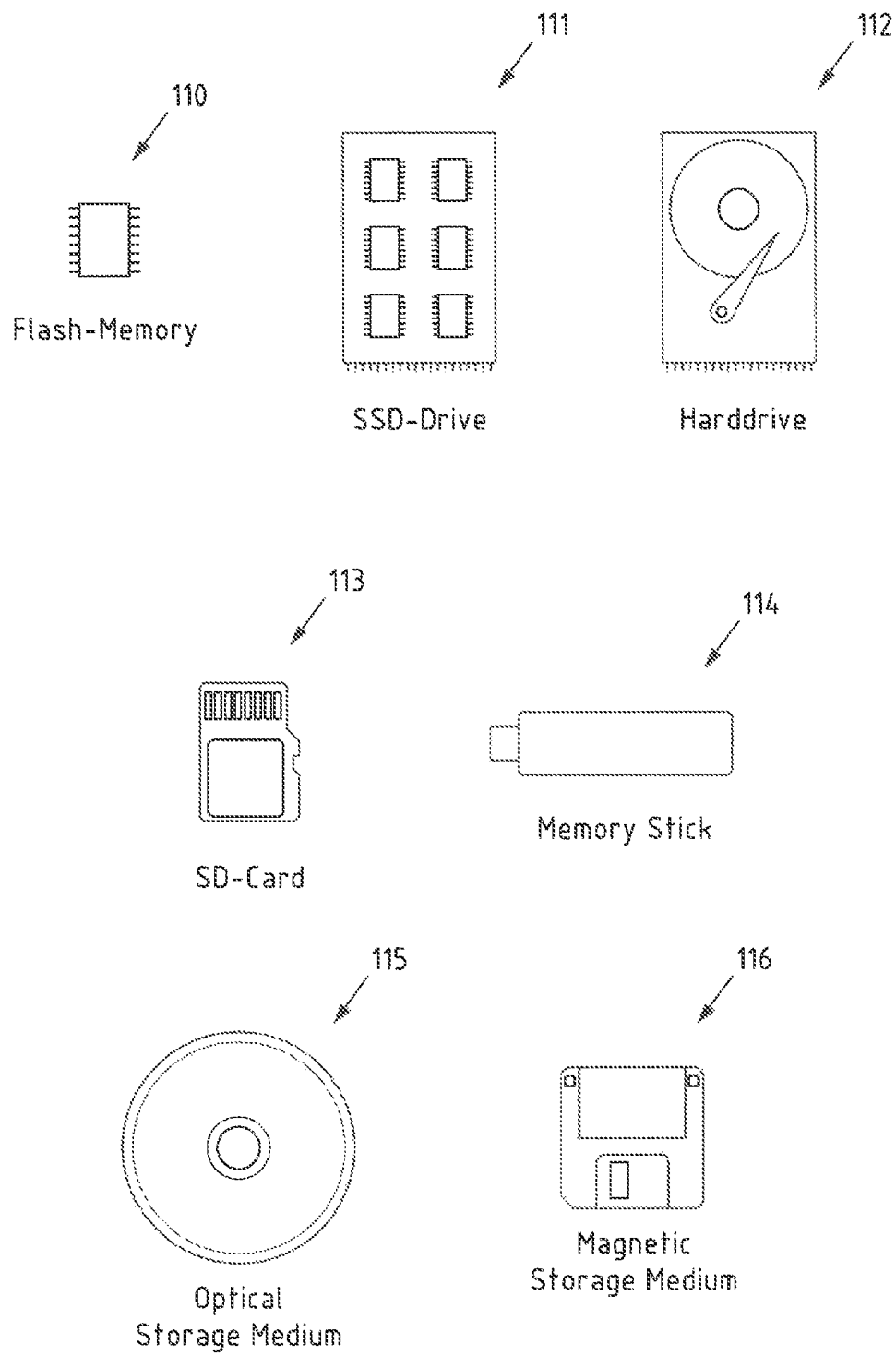
FIG. 11 is a schematic illustration of examples of tangible storage media according to the invention.

FIG. 11 is a schematic illustration of examples of tangible storage media according to the present invention, that may for instance be used to implement the program memories described of FIG. 2, 3, 4, 5 or 6. To this end, FIG. 11 displays a flash memory 110, which may for instance be soldered or bonded to a printed circuit board, a solid-state drive 111 comprising a plurality of memory chips (e.g. Flash memory chips), a magnetic hard drive 112, a Secure Digital (SD) card 113, a Universal Serial Bus (USB) memory stick 114, an optical storage medium 115 (such as for instance a CD-ROM or DVD) and a magnetic storage medium 116.

The following embodiments are also disclosed:
1. Method, performed by at least one apparatus, the method comprising:
    obtaining or holding available a radio map, the radio map having been determined based on radio node observation data of radio signals emitted from radio nodes of a radio node network;
    obtaining asset observation data of one or more radio signals, the one or more radio signals having been emitted from an asset and observed by radio nodes of the radio node network;
    determining a position estimate of the asset based on the asset observation data and the radio map.
2. Method of embodiment 1, wherein the asset is a portable asset.
3. Method of embodiment 1 or 2, wherein the asset, for emitting the one or more radio signals, comprises a radio tag associated or associable with the asset and/or an integrated radio emitter.
4. Method of any of the preceding embodiments, wherein the radio signals emitted from the asset are emitted automatically and repeatedly.
5. Method of any of the preceding embodiments, wherein the radio network is a mesh radio network.
6. Method of any of the preceding embodiments, wherein the method further comprises:
    relaying asset observation data from radio nodes of the radio node network to a target entity in the radio node network.
7. Method of any of the preceding embodiments, wherein the radio nodes of the radio network are anchor-beacons comprising a beacon functionality for emitting radio signals for determining the radio map and an anchor functionality for observing radio signals emitted from the asset.
8. Method of any of the preceding embodiments, wherein the at least one apparatus performing the method comprises one or more of the following:
    a server;
    a cloud server;
    an apparatus with virtual assistant capability;
    a smart home device; and/or
    a smart speaker.
9. Method of any of the preceding embodiments, wherein the asset radio observation data of one or more radio signals emitted from the asset and observed by radio nodes of the radio node network comprises one or more of the following:
    an identifier of the respective radio signal or asset;
    a received signal strength of the respective radio signal;
    a pathloss estimate of the respective radio signal;
    an angle of arrival of the respective radio signal; and/or
    a timing measurement of the respective radio signal.
10. Method of any of the preceding embodiments, wherein the determining of a position estimate of the asset based on the asset observation data and the radio map comprises:
    based on the asset observation data of one or more radio signals emitted from the asset and observed by radio nodes of the radio node network, determining calculated observation data, which would be observed by the asset for one or more radio signals emitted from radio nodes of the radio node network.
11. Method of embodiment 9, wherein the determining of the calculated observation data assumes a reciprocity, such that a propagation of radio signals emitted from the asset and observed by radio nodes of the radio node network corresponds to a propagation of radio signals emitted by respective radio nodes of the radio node network and observed by the asset.
12. Method of embodiment 9 or 10, wherein the determining of the position estimate of the asset comprises:
    comparing the calculated observation data with the radio map.
13. Method of any of the preceding embodiments, wherein the method further comprises one or more of:
    obtaining a request for determining a position of the asset; and/or
    outputting the determined position estimate of the asset.
14. Method of any of the preceding embodiments, wherein the method further comprises:

obtaining radio node observation data of radio signals emitted from radio nodes of the radio node network;

determining the radio map based on the radio node observation data of radio signals emitted from radio nodes of the radio node network.

15. Method performed by a system, the system comprising
at least one apparatus,
an asset, and
a radio node network comprising radio nodes,
the method comprising:
emitting, by radio nodes of the radio node network, radio signals;
determining, by the at least one apparatus, a radio map based on radio node observation data of the radio signals emitted from radio nodes of the radio node network;
emitting, from the asset, one or more radio signals;
observing, by radio nodes of the radio node network, the one or more radio signals emitted from the asset;
obtaining, at the at least on apparatus, asset observation data of the one or more radio signals emitted from the asset and observed by radio nodes of the radio node network;
obtaining, at the at least one apparatus, a request for determining a position of the asset;
determining, by the at least one apparatus, a position estimate of the asset based on the radio observation data and the radio map; and
outputting, by the at least one apparatus, the determined position estimate of the asset.

16. An apparatus comprising means for performing a method according to any of the embodiments 1 to 13.

17. A system comprising
at least one apparatus,
an asset, and
a radio node network with radio nodes,
the system being configured to perform the method of embodiment 14.

18. A computer program code, the computer program code, when executed by a processor, causing at least one apparatus to perform a method according to any of embodiments 1 to 14.

19. A computer readable storage medium, in which computer program code is stored, the computer program code causing at least one apparatus to perform, when executed by a processor, a method according to any of embodiments 1 to 14.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. Method, performed by at least one apparatus, the method comprising:
obtaining, at the at least one apparatus, a request for determining a position of an asset, the request comprising a first asset identifier;
determining, based on the first asset identifier, a second asset identifier;
obtaining or holding available a radio map, the radio map having been determined based on radio node observation data of radio signals emitted from radio nodes of a radio node network;
obtaining asset observation data of one or more radio signals, the one or more radio signals (a) having been emitted from the asset and observed by radio nodes of the radio node network and (b) comprising the second asset identifier; and
determining a position estimate of the asset based on the asset observation data corresponding to the second asset identifier and the radio map.

2. Method of claim 1, wherein the asset is a portable asset.

3. Method of claim 1, wherein the asset, for emitting the one or more radio signals, comprises a radio tag associated or associable with the asset and/or an integrated radio emitter.

4. Method of claim 1, wherein the radio signals emitted from the asset are emitted automatically and repeatedly.

5. Method of claim 1, wherein the radio network is a mesh radio network.

6. Method of claim 1, wherein the method further comprises:
    relaying asset observation data from radio nodes of the radio node network to a target entity in the radio node network.

7. Method of claim 1, wherein the radio nodes of the radio network are anchor-beacons comprising a beacon functionality for emitting radio signals for determining the radio map and an anchor functionality for observing radio signals emitted from the asset.

8. Method of claim 1, wherein the at least one apparatus performing the method comprises one or more of the following:
    a server;
    a cloud server;
    an apparatus with virtual assistant capability;
    a smart home device; and/or
    a smart speaker.

9. Method of claim 1, wherein the asset radio observation data of one or more radio signals emitted from the asset and observed by radio nodes of the radio node network comprises one or more of the following:
    an identifier of the respective radio signal or asset;
    a received signal strength of the respective radio signal;
    a pathloss estimate of the respective radio signal;
    an angle of arrival of the respective radio signal; and/or
    a timing measurement of the respective radio signal.

10. Method of claim 1, wherein the determining of a position estimate of the asset based on the asset observation data and the radio map comprises:
    based on the asset observation data of one or more radio signals emitted from the asset and observed by radio nodes of the radio node network, determining calculated observation data, which would be observed by the asset for one or more radio signals emitted from radio nodes of the radio node network.

11. Method of claim 9, wherein the determining of the calculated observation data assumes a reciprocity, such that a propagation of radio signals emitted from the asset and observed by radio nodes of the radio node network corresponds to a propagation of radio signals emitted by respective radio nodes of the radio node network and observed by the asset.

12. Method of claim 9, wherein the determining of the position estimate of the asset comprises:
    comparing the calculated observation data with the radio map.

13. Method of claim 1, wherein the method further comprises one or more of:
    obtaining a request for determining a position of the asset; and/or
    outputting the determined position estimate of the asset.

14. Method of claim 1, wherein the method further comprises:
    obtaining radio node observation data of radio signals emitted from radio nodes of the radio node network; and
    determining the radio map based on the radio node observation data of radio signals emitted from radio nodes of the radio node network.

15. An apparatus comprising means for performing a method according to claim 1.

16. A system comprising
    at least one apparatus,
    an asset, and
    a radio node network with radio nodes,
    the system being configured to perform the method of claim 1.

17. A computer program code, the computer program code, when executed by a processor, causing at least one apparatus to perform a method according to claim 1.

18. A non-transitory computer readable storage medium, in which computer program code is stored, the computer program code causing at least one apparatus to perform, when executed by a processor, a method according to claim 1.

19. The method of claim 1, wherein the first identifier is a human language-based identifier and the second identifier is a machine-readable identifier.

20. Method performed by a system, the system comprising
    at least one apparatus,
    an asset, and
    a radio node network comprising radio nodes,
    the method comprising:
    emitting, by radio nodes of the radio node network, radio signals;
    determining, by the at least one apparatus, a radio map based on radio node observation data of the radio signals emitted from radio nodes of the radio node network;
    emitting, from the asset, one or more radio signals, the one or more radio signals each comprising a second identifier;
    observing, by radio nodes of the radio node network, the one or more radio signals emitted from the asset;
    obtaining, at the at least one apparatus, asset observation data of the one or more radio signals emitted from the asset and observed by radio nodes of the radio node network;
    obtaining, at the at least one apparatus, a request for determining a position of the asset, the request comprising a first asset identifier;
    determining, based on the first asset identifier, the second asset identifier;
    determining, by the at least one apparatus, a position estimate of the asset based on the radio observation data corresponding to the second asset identifier and the radio map; and
    outputting, by the at least one apparatus, the determined position estimate of the asset.

* * * * *